(12) United States Patent
Kazmi et al.

(10) Patent No.: US 7,304,964 B2
(45) Date of Patent: Dec. 4, 2007

(54) FACILITATING SYNCHRONIZATION OF COMMUNICATION STATIONS IN A RADIO COMMUNICATION SYSTEM

(75) Inventors: Seemi Kazmi, San Diego, CA (US); Dan Picker, San Diego, CA (US)

(73) Assignee: Nokia Corporation, Espoo (FI)

( * ) Notice: Subject to any disclaimer, the term of this patent is extended or adjusted under 35 U.S.C. 154(b) by 1036 days.

(21) Appl. No.: 10/078,222

(22) Filed: Feb. 19, 2002

(65) Prior Publication Data
US 2002/0159416 A1 Oct. 31, 2002

Related U.S. Application Data

(60) Provisional application No. 60/274,119, filed on Mar. 8, 2001, provisional application No. 60/274,089, filed on Mar. 8, 2001, provisional application No. 60/270,217, filed on Feb. 20, 2001.

(51) Int. Cl.
*H04B 7/212* (2006.01)
(52) U.S. Cl. .................. 370/324; 370/350; 370/466; 455/442
(58) Field of Classification Search .............. 370/312, 370/320, 324, 331, 335, 342, 350, 441, 466, 370/479; 455/336–444
See application file for complete search history.

(56) References Cited

U.S. PATENT DOCUMENTS

| | | | |
|---|---|---|---|
| 6,052,592 A | 4/2000 | Schellinger et al. | |
| 6,188,898 B1 * | 2/2001 | Phillips | 455/433 |
| 6,246,673 B1 * | 6/2001 | Tiedemann et al. | 370/333 |
| 6,337,983 B1 * | 1/2002 | Bonta et al. | 455/437 |
| 6,351,637 B1 | 2/2002 | Lee et al. | |
| 6,377,808 B1 | 4/2002 | Korneluk et al. | |

(Continued)

FOREIGN PATENT DOCUMENTS

WO WO 2005/015748 2/2005

OTHER PUBLICATIONS

The International Search Report for PCT/IB02/00495; filed Feb. 20, 2002; Date of Completion Sep. 8, 2002; Date of Mailing Nov. 5, 2002.

(Continued)

*Primary Examiner*—Chi Pham
*Assistant Examiner*—Donald L Mills
(74) *Attorney, Agent, or Firm*—Alston & Bird LLP

(57) ABSTRACT

Apparatus, and an associated method, performing synchronization messages to be used to synchronize operation of a mobile station with that of a base transceiver station in a cellular, or other radio communication system. The formatter of a message generator formats two or more different sync channel messages, a first of which is used by a mobile station constructed according to a pre-IS-2000 cellular communication standard, and a second of which is utilized by a mobile station constructed pursuant to the IS-2000 standard. The first-type sync channel message is an IS-2000 standard message that has been contracted to make it more compatible with older mobile stations, and has been provided with a field indicating that an additional sync message is also available. The additional sync message may be a full IS-2000 sync message, may include only selected IS-2000 fields, or may include other fields.

25 Claims, 3 Drawing Sheets

U.S. PATENT DOCUMENTS

| | | | |
|---|---|---|---|
| 6,404,775 B1 | 6/2002 | Leslie et al. | |
| 6,438,117 B1 | 8/2002 | Grilli et al. | |
| 6,567,666 B2 * | 5/2003 | Czaja et al. | 455/442 |
| 6,577,609 B2 * | 6/2003 | Sharony | 370/312 |
| 6,584,087 B1 * | 6/2003 | Czaja et al. | 370/335 |
| 6,594,242 B1 * | 7/2003 | Kransmo | 370/331 |
| 6,704,581 B1 * | 3/2004 | Park et al. | 455/553.1 |
| 6,836,471 B2 * | 12/2004 | Holma et al. | 370/331 |
| 6,873,647 B1 * | 3/2005 | Tiedemann et al. | 375/145 |
| 2004/0022180 A1 | 2/2004 | Stolpman et al. | |

OTHER PUBLICATIONS

The International Search Report for PCT Application No. PCT/IB2006/001798; Filed Jun. 29, 2006; Date of Completion Jan. 11, 2007; Date of Mailing Jan. 15, 2007.

The Written Opinion for PCT Application No. PCT/IB2006/001798; Filed Jun. 29, 2006.

Peter Trifonov, Elena Costa, Egon Schulz; *Adaptive Multilevel Coding in OFDM Systems*; Vehicular Technology Conference; May 30-Jun. 1, 2005; pp. 1566-1570; vol. 3; Section II-C.

* cited by examiner

| Field | Length (bits) |
|---|---|
| P_REV | 8 |
| MIN_P_REV | 8 |
| SID | 15 |
| NID | 16 |
| PILOT_PN | 9 |
| LC_STATE | 42 |
| SYS_TIME | 36 |
| LP_SEC | 8 |
| LTM_OFF | 6 |
| DAYLT | 1 |
| PRAT | 2 |
| CDMA_FREQ | 11 |
| EXT_CDMA_FREQ | 11 |
| SR1_BCCH_SUPPORTED | 1 |
| SR1_NON_TD_FREQ_INCL | 0 or 1 |
| SR1_CDMA_FREQ_NON_TD | 0 or 11 |
| SR1_BRAT_NON_TD | 0 or 2 |
| SR1_CRAT_NON_TD | 0 or 1 |
| SR1_BCCH_CODE_CHAN_NON_TD | 0 or 6 |
| SR1_TD_INCL | 0 or 1 |
| SR1_CDMA_FREQ_TD | 0 or 11 |
| SR1_BRAT_TD | 0 or 2 |
| SR1_CRAT_TD | 0 or 1 |
| SR1_BCCH_CODE_CHAN_TD | 0 or 6 |
| SR1_TD_MODE | 0 or 2 |
| SR1_TD_POWER_LEVEL | 0 or 2 |
| SR3_INCL | 1 |
| SR3_CENTER_FREQ_INCL | 0 or 1 |
| SR3_CENTER_FREQ | 0 or 11 |
| SR3_BRAT | 0 or 2 |
| SR3_BCCH_CODE_CHAN | 0 or 7 |
| SR3_PRIMARY_PILOT | 0 or 2 |
| SR3_PILOT_POWER1 | 0 or 3 |
| SR3_PILOT_POWER2 | 0 or 3 |

Prior Art

FIG. 2

FACILITATING SYNCHRONIZATION OF COMMUNICATION STATIONS IN A RADIO COMMUNICATION SYSTEM

RELATED APPLICATIONS—CLAIM OF PRIORITY

This application is related to and claims the benefit of the respective filing dates of U.S. Provisional Applications Nos. 60/270,217, filed on Feb. 20, 2001; 60/274,119, filed on Mar. 8, 2001; and 60/274,089, filed on Mar. 8, 2001, all of which are incorporated herein by reference.

FIELD OF THE INVENTION

The present invention relates generally to a manner of forming synchronization messages generated in a communication system, such as a cellular system, to synchronize operations of a sending station together with a receiving station. More particularly, the present invention relates to generating synchronization messages to synchronize communication stations constructed pursuant to different standards, for example, the CDMA-cellular IS-2000 standard and the CDMA-cellular IS-95 standard, with synchronization messages generated by a single sending station.

BACKGROUND OF THE INVENTION

The use of communication systems through which to communicate data is a necessary adjunct of modern society. A wide variety of different types of communication systems have been developed and are regularly utilized to effect communication of information between sending and receiving stations positioned at the separate, spaced-apart locations. This communication between distant stations may be carried via a wire, or more typically, a series of wires forming a communications network. Such a network may include a multitude of switches so that any station connected with the network may communicate with any other connected station. In addition to wireline systems, wireless radio frequency signals may also carry communication information over part or all of the communication path. Still other forms of information transport include microwave, infrared, and optical signals.

Improvements to existing types of communication systems, as well as implementation of new types of communication systems, have been made possible as a result of advancements in communication technologies. The advances include not only more efficient and effective hardware, but better techniques for information processing and transmission as well. The resulting improvements include better transmission quality, lower error rates, fewer losses of connection, and increased network capacity. Radio communication systems are exemplary of communication systems that have benefited from these advancements in communication technologies. Modern radio networks transmit a much greater quantity of information, and do so more faithfully, than their less sophisticated predecessors.

A radio communication system, of course, inherently permits an increase in communication mobility in contrast to communications effectuated through the use of conventional, wireline communication systems. Increased communication mobility is provided as the communication channels between the sending and receiving stations of the radio communication systems are defined upon radio links formed therebetween. Typically, users subscribing to service through a wireless radio communication network carry their own uniquely identifiable mobile station. The mobile stations communicate with a fixed base station, which is, in turn, connected in some way to the rest of the network. The channel from the base station to the mobile station is often referred to as the forward channel, and the reverse channel carries transmissions from the mobile back to the base station. Note that the radio communication channels do not require fixed connections between the sending and receiving stations for their formation, but rather may be repeatedly established and broken on an ad hoc basis.

One type of radio communication system that has achieved high levels of usage is the cellular communication system. In a cellular system, the network-covered geographic area is divided into relatively small sections, or cells, each having at least one antenna connected to a base station. Mobile stations are able to communicate with the base station of the cell in which they are currently located and base stations of the neighboring cells, though generally not far beyond that. In this way, channels can be re-used by many cells, so long as the cells sharing a given channel are not adjacent (or too close) to each other. This arrangement permits the system to handle many more calls at one time than if each call had to be assigned channels unique throughout a large area. In addition, various techniques have been devised for sharing available bandwidths among a group of callers, even if they are in the same cell. Time-division, multipleaccess (TDMA), for example, divides the available bandwidth into time slots, with one or more time slots being assigned to each communication. TDMA takes advantage of the fact that few ongoing communications require a channel one-hundred percent of the time. Another scheme, one that will be further described along with an embodiment of the present invention, is code division multiple access (CDMA) in which multiple communications can be processed and sent out at the same time, but received and processed only by a target mobile station in possession of necessary information about how the signal was encoded before transmission. CDMA in this way also makes it difficult for calls to be intercepted—a great advantage to many subscribers.

When advances in technology occur, changes to the network components may be necessary. When a network infrastructure of a cellular communication system is to be upgraded, the network infrastructure of such communication system is preferably altered in a manner as to effect the upgrade while also permitting existing mobile stations, operable pursuant to the previous communication-system requirements to continue operation in the upgraded or revised system. Although equipment owned by the network operator may be changed out promptly when the upgrade is initiated, subscriber-owned mobile stations may continue to be used for months or even years before being replaced. The subscribers will still want to use them. The quality of an upgrade or revision that allows old as well as new equipment to be used with the upgraded network is called backward compatibility. Were it not present, hundreds of subscribers might suddenly find themselves unable to place calls without buying a new telephone. Backward compatibility is, therefore, an important feature.

In order to ensure backward compatibility, the upgraded system must be carefully constructed in order to provide for the communication using both old and new mobile stations. Many, if not all, facets of operation of the communication system must be considered to insure the backward compatibility of the devices intended to be operable therein.

Synchronization is one such facet. Synchronization operations performed between the network infrastructure and the mobile station of the cellular communication system are required prior to effectuation of voice and data traffic communications between the network infrastructure and a mobile station. Synchronization of a mobile station with a network infrastructure insures that the timing of operations of the network infrastructure and the mobile station is necessary in CDMA systems for the mobile station to be able to detect and process a received signal traffic (that is, encoded voice or data information). In CDMA systems, a synchronization message (sync message) is sent out (broadcast) continuously from base stations within the network over a synchronization channel (sync channel). The sync message contains the identity of the base station, system time, and other information so that the mobile stations in the vicinity receive the information and can perform sync-dependent processing of other transmitted signals. Without such synchronization, multiple-access schemes such as CDMA would fail utterly.

Backward-compatibility of synchronization operations must therefore be provided when a cellular communication system is upgraded, or otherwise revised, so that both mobile stations constructed to be operable pursuant to the upgraded communication system and mobile stations constructed to be operable pursuant to the pre-existing cellular communication system can be synchronized to the network infrastructure of the upgraded, or revised communication system. As noted above, cellular communication systems have been constructed pursuant to various multiple-access schemes such as CDMA. An exemplary implementation of a CDMA cellular communication system is referred to as an IS-95 (interim standard-1995) system. Such a system is constructed to be operable pursuant to operational requirements set forth in the TIA/EIA IS-95 standard promulgated by the Telecommunications Industry Association (TIA) and the Electronic Industries Alliance (EIA), which are industry regulatory groups. IS-95 communication systems have, for several years, been installed and commercially implemented in various geographical regions. Mobile stations constructed according to the IS-95 standard should work satisfactorily in these regions regardless of their manufacturer.

Proposals have been set forth, however, for a revised set of CDMA communication-system standards that are commonly referred to as TIA/EIA IS-2000. The IS-2000 standard is intended to specify a CDMA spread-spectrum radio interface that, among other things, meets the requirements for third generation (3G) wireless communications systems. Although backward compatibility was intended, it has been reported that the IS-2000 sync message is posing difficulty for some IS-95 mobile stations. The IS-2000 standard pertaining to synchronization operations differs with the synchronization operations set forth in the pre-existing IS-95 system. In particular, a synchronization message, herein referred to an IS-2000 sync channel message, includes an additional eleven-bit field (EXT_CDMA_FREQ) together with five bits of zero-padding relative to the synchronization message used in an IS-95 system. The additional field and zero-padding bits causes the message transmission of an IS-2000 sync channel message to extend into an additional 26.66 ms sync channel frame compared to the pre-IS-2000 message. Some mobile stations constructed to be operable pursuant to the IS-95 system are unable to properly detect and act upon the increased-length sync channel message, as it is presently defined.

An alternate synchronization message scheme is therefore required for the IS-2000 or other system that is better able to be backwardly-compatible to pre-existing system types, while still meeting the requirements of 3G and other future systems.

It is in light of this background information related to the radio communication systems that the significant improvements of the present invention have evolved.

SUMMARY OF THE INVENTION

The present invention, accordingly, advantageously provides apparatus, and an associated method, by which to efficiently form synchronization messages generated in a cellular, or other radio communication system to synchronize operations of a sending station together with receiving stations constructed according to varying standards. Specifically, for example, through operation of an embodiment of the present invention, a manner is provided by which to generate synchronization messages to synchronize communication stations constructed pursuant to the CDMA-cellular IS-2000 standard and the CDMA-cellular IS-95, or some other pre-IS-2000 standard, using synchronization messages generated by a single sending station. Backward compatibility is provided so that the synchronization messages generated by the single sending station as selectably used by the various receiving stations to effectuate synchronization operations with the sending station. Both types of receiving stations are capable of receiving, and selectably performing synchronization operations, responsive to the synchronization messages, depending upon the values thereof.

In one aspect of the present invention, a synchronization message is provided for an IS-2000 cellular communication system for communication to a mobile station constructed to be operable pursuant to a pre-IS-2000 standard. The synchronization ("sync") message generated for transmission to this mobile station is an IS-2000 sync message that does not include the IS-2000 specified field EXT_CDMA_FREQ, the shorter message being more reliably compatible with the pre-IS-2000 mobile station. The shorter message also preferably contains, however, a new field that has been added to the IS-2000 sync message. This new field, herein referred to as ALT_SCH_MSG_P_REV, indicates that a different sync message is also being formed and transmitted, and the value contained in the ALT_SCH_MSG_P_REV field preferably indicates the minimum-standard mobile station to which this different message will be useful.

In other words, in this aspect, the apparatus of the present invention is a sync message generator that generates a first-type sync message that is an IS-2000 sync message lacking the field EXT_CDMA_FREQ, but supplemented with the field ALT_SCH_MSG_P_REV. It also generates a second-type sync message that contains information that will be useful to receiving stations constructed according to at least the protocol revision level specified in ALT_SCH_MSG_P_REV. This second-type message may simply include the EXT_CDMA_FREQ field (which was not included in the first message) and the ALT_SCH_MSG_P_REV field. It may also include these fields and, in addition, the remainder of the standard IS-2000 fields. When only a limited number of fields are included, the capable receiving mobile station will use both the first-type sync message and the second-type sync message, where all of the necessary IS-2000 fields are included in the second-type sync message, the first-type message may simply be ignored. Limiting the number of fields in the second-type message, therefore, avoids duplication and allows for future expansion, but may require mobile station enhancements to provide for synchronizing using two messages instead of one.

In another aspect, the present invention is a method of transmitting sync messages of a first type and of a second type, the first type being a shortened version of the IS-2000 sync message that is reliably usable by mobile stations constructed according to a pre-IS-2000 standard, the second type of sync message being usable by mobile stations constructed according to the IS-2000 or a more recent standard. Where necessary or desirable, there may be more than two types of sync messages.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 2 is a table listing the fields that are included in an exemplary IS-2000 sync message of the prior art.

DETAILED DESCRIPTION OF THE INVENTION

Figure 1:
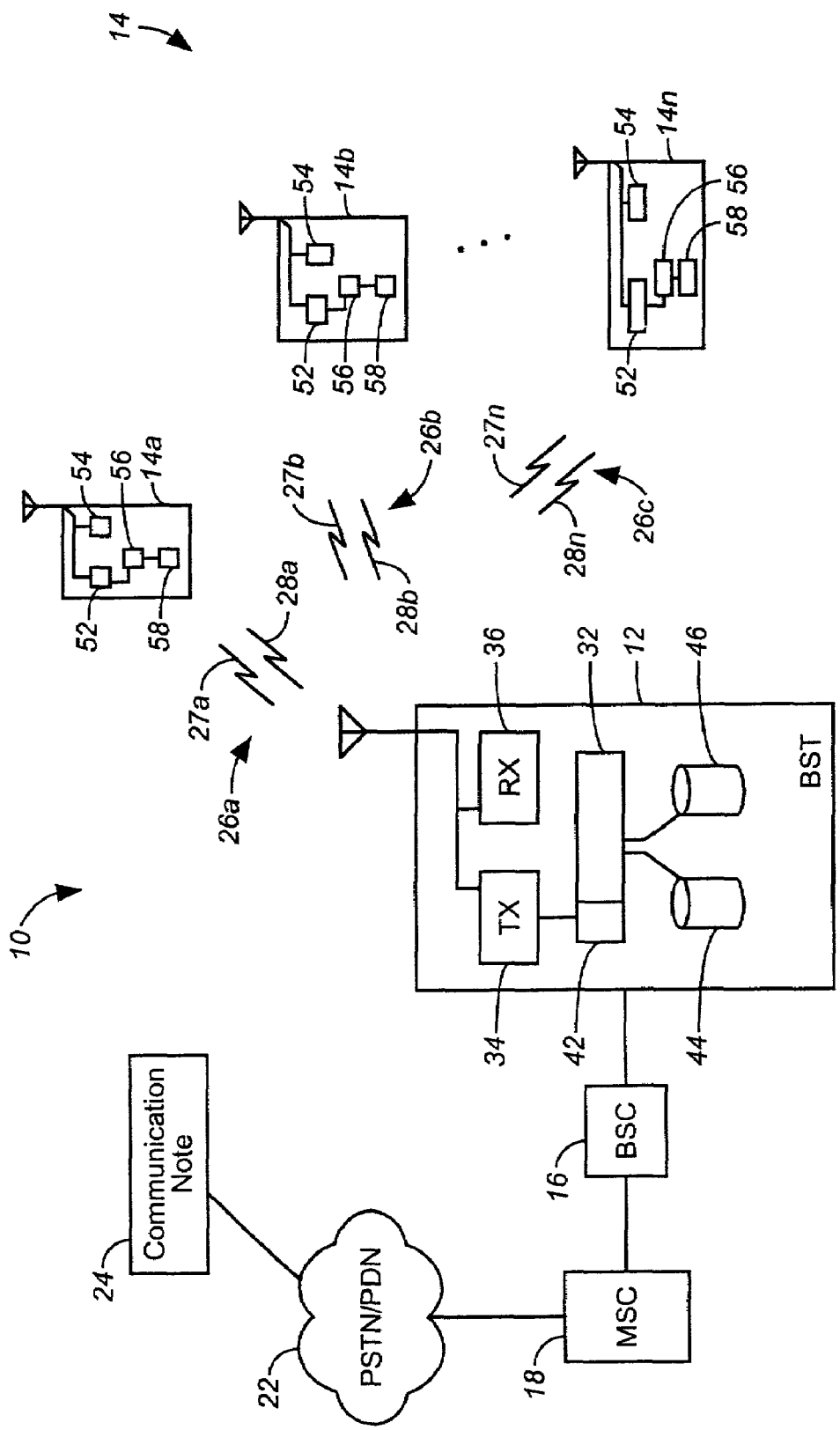
FIG. 1 illustrates a functional block diagram of a communication system in which an embodiment of the present invention is operable.

FIG. 1 illustrates an exemplary communication system, shown generally at 10, that may be configured to send synchronization messages according to an embodiment of the present invention. Communication system 10 provides for two-way communications between a sending station 12 and a plurality of receiving stations, generally denominated receiving station 14, which is shown here to include individual stations 14a, 14b, . . . 14n. (Although three receiving stations 14 are shown in FIG. 1, there may be any number.) In the exemplary implementation shown in FIG. 1, the communication system 10 is formed of a CDMA (code division multiple access) cellular communication system in which the sending station, here a base transceiver station (BTS) 12 of the cellular communication system, and the receiving stations 14a through 14n form mobile stations operable in the cellular communication system. The mobile stations 14a through 14n are representative of mobile stations constructed pursuant to different revisions of the CDMA cellular communication standards. While the following description shall describe operation of the exemplary implementation of the communication system 10 in which the communication system forms a CDMA cellular communication system, it should be understood that operation of an embodiment of the present invention is similarly implementable in other types of communication systems.

In FIG. 1, for purposes of illustration, the mobile station 14a is constructed to be operable pursuant to a pre-IS-2000 standard (such as IS-95), the mobile station 14b is constructed to be operable pursuant to the IS-2000 standard, and the mobile station 14n is constructed to be operable to a revised IS-2000 standard. The BTS 12 is preferably constructed to be operable to communicate with any and all of mobile stations 14.

The BTS 12 is here shown to be coupled to a base station controller (BSC) 16. The BSC 16 is operable to control operation of the BTS 12. The BSC 16 is, in turn, coupled to a mobile switching center (MSC) 18. Note that each cell will typically have at least one BSC 16, and MSC 18 may, and generally will, be connected to a large number of them. The MSC 18 performs switching operation and is, in turn, coupled to a communications network backbone, here as a PSTN/PDN (public-switched telephonic network/packet data network) backbone 22. The PSTN/PDN backbone 22 is coupled to other devices, such as a communication node 24. Node 24 may be, for example, a PSTN telephone, a Web Server, or another mobile station. Note that other mobile stations in the area may be able to communicate with any or all of mobile stations 14 without establishing a connection through the PSTN/PDN backbone 22.

A radio communication path formable between the communication node 24 and one of the mobile stations 14 provides for the effectuation of communication of information therebetween. The communication path includes a radio link formed between the BTS 12 and the appropriate mobile station, the radio links being numbered 26a . . . 26n, respectively. Each radio link 26 includes a forward CDMA channel 27 and a reverse CDMA channel 28. The radio links 26 are shown separately for illustration; in reality, the various channels depicted separately in FIG. 1 may in fact be carrying the same information. They are simply representative of a line of communication between BTS 12 any one of the mobile stations 14.

Prior to formation of the communication path between the communication node 24 and the target or originating mobile station, signaling is required to be effectuated between the mobile station and the BTS 12. For this to occur, the mobile stations 14 must detect and become synchronized to the BTS 12. For this reason, signaling effectuated between the BTS 12 and the mobile station 14 includes generation of synchronization messages at the BTS 12 upon a synchronization channel, often referred to as a sync channel, defined upon the forward channel 27 of the radio link 26. Operation of an embodiment of the present invention generates synchronization messages that are selectably utilized by the mobile stations 14 according to their capability. (Unusable sync messages are simply disregarded.) Elements of a synchronization message generator 32 of an embodiment of the present invention are formed at the BTS 12. In other implementations, various elements of the message generator 32 are positioned at other locations, such as distributed throughout the network infrastructure, or located elsewhere.

The base transceiver station 12 is here shown also to include a transmit portion 34 and a receive portion 36. The receive portion 36 is circuitry operable to receive, and to operate upon, signals transmitted thereto by the mobile stations 14. Transmit portion 34 of BTS 12 is operable to transmit signals upon the forward CDMA channel 27 of radio link 26 to the mobile stations 14, including synchronization messages generated by message generator 32 pursuant to operation of an embodiment of the present invention.

The message generator 32 is here shown to include a formatter 42 coupled to the transmit portion 34 of BTS 12. The formatter 42 is operable to format synchronization messages to be broadcast upon the radio link 26 for communication to the mobile stations 14. As mentioned above, however, each of the mobile stations 14 is constructed to be operable in a system designed according to a different set or version of standards. Although later standards are typically intended to be backwardly compatible with their predecessors, experience has shown that with IS-2000 this intended result is not always achieved. In particular, some mobile stations constructed according to the IS-95 standard are unable to reliably detect IS-2000 sync messages. When that occurs, the mobile station does not synchronize with the BTS 12 and regular communication is impossible. To counter this deficiency, a manner is provided by which to efficiently encode data such that more than one sync message generated at a BTS 12 is sent to mobile stations 14. The formatter 42 of generator 32 is operable to generate multiple synchronization messages for communication to mobile stations 14 within range. In accordance with an embodiment of the present invention, however, more than one (and preferably two) different sync channel messages are generated. The plurality of types of sync messages are preferably sent out sequentially over the sync channel. As used here, "sequentially" simply means that one type of message will follow another, but no specific transmission pattern is required. In general, mobile stations receiving the transmitted sync channel messages use those they are capable of using and disregard the others. Note, however, that this process does not guarantee compatibility with every possible mobile station—some will be unable to access the system at all.

In a preferred embodiment, there is formed by generator 32 a Type I sync channel message and a Type II sync channel message, the contents of which are described below. The Type II message, for example, will typically be usable by mobile stations 14 constructed according to the IS-2000 standard or better, such as mobile station 14b and mobile station 14n of the embodiment of FIG. 1. The Type I message will also be useful to these mobile stations as well, possibly by, among other things, carrying an indication detectable by them that a Type II message follows. A pre-IS-2000 mobile station, such as mobile station 14a of FIG. 1, will be able to use only the Type I message, and will simply disregard the Type II message that follows. If desired, formatter 42 of message generator 32 forms sync messages that cause selected ones, and not others, of the mobile stations to act responsive to detection of the messages. Here in FIG. 1, the formatter 42 shown to be coupled to databases 44 and 46. Values selectively retrieved from the databases 44 and 46 are used by the formatter selectively to populate the fields of the various sync messages.

Each of the mobile stations 14 is shown to include both a receive portion 52 and a transmit portion 54. Additional apparatus of an embodiment of the present invention is also formed at the mobile stations. At each mobile station, a determiner 56 is coupled to a corresponding receive portion 52 of the respective mobile station. The determiner 56 is operable to, among other functions, determine values of the data contained in the sync message fields of at least one synchronization message transmitted thereto. Responsive to the value contained in the fields, the mobile station 14 operates responsive thereto or disregards the sync message. Each mobile station is further shown to include a synchronization element 58 coupled to the determiner 56. The synchronization element 58 is selectively operable to effectuate synchronization of the mobile station 14 with the BTS 12 when the determiner 56 determines the revision number of the sync message detected at the mobile station to be of a usable type. Note that while pre-IS-2000 mobile station 14a is shown to have a determiner 56, this component is not necessarily present. The function of "determining" may simply include receiving and processing a valid sync message and ignoring one that, to the pre-IS-2000 mobile station 14a, appears to be invalid.

In this regard, it is here reiterated that while the preferred embodiment of the present invention described herein concerns a novel manner of efficiently forming and sending IS-2000 sync messages such that they are not only more advantageously formed for future development but also more certainly acceptable to pre-IS-2000 (for example, IS-95) mobile stations or other similar equipment. While the greatest advantage thus obtains from so applying the methodology of the present invention, it may have advantageous application in other similar compatibility scenarios as well. For example, Applicants do not intend to limit the scope of the claimed invention to the specific standards of the preferred embodiment.

Returning to the description of a preferred embodiment, the sync message required by the IS-2000 standard may be described as a series of fields, each field containing certain information relevant to the operation of synchronizing the mobile station receiving the message to the BTS 12. FIG. 2 provides a table 200 showing the fields of the sync channel message according to TIA/EIA/IS-2000, which is entirely incorporated herein by reference for the purpose of supplying background for the preferred embodiment. The purpose of each field is set forth in this reference, and only those that are of interest or relevant to the present invention will be discussed here.

For example, P_REV 201 simply indicates the protocol revision level upon which the base station, such as BTS 12/BSC 16 is operating, while MIN_P_REV 202 is the minimum protocol level that the base station supports. The SID field 203 and NiD field 204 indicate, respectively, the system and network identity. The field SYS_TIME 210 contains a very precise report of system time at a moment identifiable to receiving mobile stations. System time, in contrast to, for example, system ID, is therefore constantly changing and the value in the field SYS_TIME 210 will vary from one sync channel message to the next. The same is true of the field LC_STATE 212, which gives the state of the long code corresponding to the system time in SYS_TIME 210. (The long code is a pseudorandom noise (PN) sequence used for uniquely associating certain CDMA transmissions with a particular mobile station.) The field CDMA_FREQ 205 is set to the CDMA frequency assignment, which may be the CDMA frequency assignment for the sync channel itself EXT_CDMA_FREQ 206 is for an extended frequency assignment for a primary paging channel. Note that these and the other fields shown on table 200 of FIG. 2 form a single sync message and, in the sense used herein, a single "type" of sync message. As alluded to earlier, the addition of the 11-bit field EXT_CDMA_FREQ 206, plus five bits of zero padding as specified in CDMA IS-2000 may extend this "type" message beyond the practicable (if not theoretical) ability of a pre-IS-2000 mobile station to detect and process. In order to correct this deficiency, in accordance with the present invention the EXT_CDMA_FREQ 206 field is removed from the IS-2000 sync message, and a first-type synchronization message is created and used in conjunction with at least a second-type synchronization message.

Figure 3:
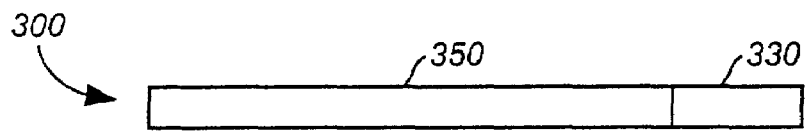
FIG. 3 is a representation of a Type I sync message generated according to an embodiment of the present invention.

FIG. 3 illustrates a first-type synchronization message, herein referred to as a Type I message formed by the message generator 32, and here shown generally at 300. In this embodiment, Type I message 300 is substantially the CDMA-IS-2000 message referred to above and described in FIG. 2, excepting the field EXT_CDMA_FREQ 206. For convenience, this message will be referred to herein as abridged IS-2000 sync message 350, which may also exclude from the standard IS-2000 sync message zero-padding bits or other fields not necessary to the synchronization of mobile stations constructed according to a pre-IS-2000 standard. Note that if, in future revisions of the IS-2000 standard, additional fields are added to the sync channel message (or the length of existing fields increased), then additional modification of this longer message may have to be made to produce an acceptable Type I sync message.

In a preferred embodiment, however, the Type I message does include a new field ALT_SCH_MSG_P_REV 330. The new field ALT_SCH_MSG_P_REV 330 is preferably eight bits in length, and the resultant sync channel message length is still, in most cases, short enough to be properly handled by pre-IS-2000 mobile stations. When used, the field ALT_SCH_MSG_P_REV 330 shall preferably be set by the base (sending) station to a non-zero value to indicate that the base station is sending, in addition to the Type I message, at least one other (different) message on the sync channel. Conversely, setting ALT_SCH_MSG_P_REV 330 to a zero value would indicate that the Type I sync message was the only sync message available and must be used for synchronization. In this sense, the field ALT_SCH_MSG_P_REV 330 may be referred to as a "second-type-message-indicating field" because its value depends on whether a second-type message is also being generated by the sending station, and preferably also on protocol level related to the second-type message. (It need not, however, be the only such indicator.) Where ALT_SCH_MSG_P_REV is set to a non-zero zero value, it is preferably set to the protocol revision level that a mobile station must support in order to use instead (or also) the second synchronization message. This second-type synchronization message carries information useful and relevant to the synchronization operation as performed by higher-protocol capable ("enhanced") mobile stations (such as, for example, mobile stations 14*b* and 14*n* of FIG. 1). There may be one or more such enhanced-capability messages, but for convenience only a second one will be discussed. This second synchronization message may take one of several forms.

Figure 4:
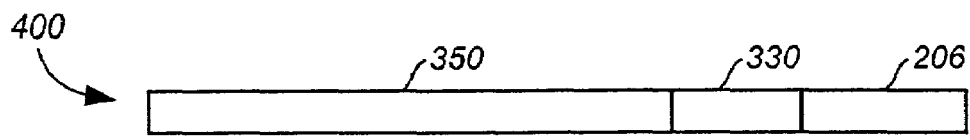
FIG. 4 is a representation of a Type II sync message generated according to an embodiment of the present invention.

FIG. 4 illustrates one such second-type synchronization message, herein referred to as a Type II message formed by the message generator 32, and here shown generally at 400. The message 400 also includes the fields of the Type I sync message, including ALT_SCH_MSG_P_REV 330. In this embodiment, the Type II message 400 also includes the field EXT_CDMA_FREQ 206. EXT_CDMA_FREQ 206 is shown separate from abridged IS-2000 message 350 only for clarity and not to indicate any change in, for example, position or priority. Remember that this field 206 was removed from the Type I sync message, in part to permit contraction of the Type I sync message to a length that may be reliably processed by IS-95 mobile stations (to which this field is of no use) and partly to create the capacity to add the (shorter) field ALT_SCH_MSG_P_REV 330. As should be apparent, where a synchronization message such as sync message 400 is used (by a capable mobile station), the Type I sync message may simply be discarded.

Figure 5:
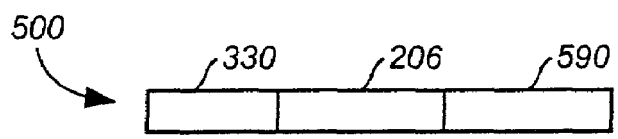
FIG. 5 is a representation of a Type II sync message generated according to another embodiment of the present invention.

FIG. 5 illustrates a Type II sync message 500 formed according to another preferred embodiment of the present invention. In this embodiment, Type II message 500 does not substantially replicate the Type I message, but instead includes, at a minimum, the fields EXT_CDMA_FREQ 206 and ALT_SCH_MSG_P_REV 330. As before, an IS-95 (or other pre-IS-2000) mobile station will merely use the Type I message and discard the Type II message, which it is unable to process. In addition, in this embodiment, a mobile station that is constructed to the IS-2000 standard or better, in order to use the Type II message, must be capable of synchronizing to the system (that is, storing and maintaining the system time from field 210 and the long code state from field 212) while at the same time decoding sync channel messages. The enhanced mobile station in the embodiment of FIG. 5 will use both the Type I and the Type II messages for synchronization. This is in contrast to the embodiment of FIG. 4, where the enhanced mobile station is simply referred by the Type II sync message to the Type I sync message.

In the embodiment of FIG. 5, the Type II message may also contain additional fields 590 if desired. This feature allows room for expansion by including new fields, or simply allows for the inclusion of more Type I fields if it makes processing more efficient or is otherwise desirable. Note that because this embodiment permits the addition of additional fields 590, including fields also found in the Type I sync message 300, the Type II message 500 may resemble or even be identical to the Type II message 400 of the previously described embodiment. The receiving station, however, may nevertheless process the sync messages differently. That is, the synchronizing mobile station may extract certain information from the Type I sync message 300 and other information from the Type II sync message 500 regardless of whether all of the Type I fields are present in the Type II sync message 500.

Figure 6:
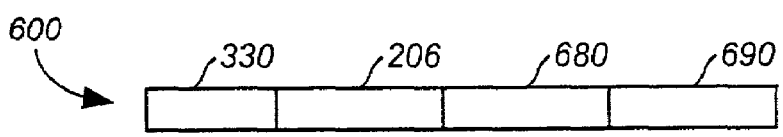
FIG. 6 is a representation of a Type II sync message generated according to yet another embodiment of the present invention.

FIG. 6 illustrates a portion of a Type II message 600 formed according to a particularly preferred embodiment of the present invention. In this embodiment, the Type II sync message 600 includes the fields EXT_CDMA_FREQ 206, ALT_SCH_MSG_P_REV 330, and selected time-variable Type I sync message fields 680. Selected time-variable fields 680 are generally those that will have a different value in message 600 than in a proceeding Type I sync message 300 due to the passage of time. For example, the long code state from field LC_STATE 212 and the system time from field SYS_TIME 210 will differ because the time and state changes continuously and will not remain the same from generation of the Type I message 300 to generation of the Type II field 600. As with the previous embodiment, any mobile station so is capable will perform the synchronization operation using both the Type I and Type II sync messages, the static fields being extracted from Type I sync message 300 and the dynamic fields from Type II sync message 600. As before, however, a pre-CDMA-IS-2000 mobile station will simply synchronize using the Type I message 300 and discard the Type II message 600, which it will be unable to process. Type II sync message 600 may also include additional fields 690 if necessary or desirable. Finally, note that selected time-variable fields 680 need not include all time-variable fields from the Type I message. For example, the change in the system time value stored in SYS_TIME 210 is easily calculated and need not be repeated from one type of message to another.

Thereby, a manner is provided by which to efficiently form synchronization messages generated in a cellular, or other radio communication systems. Backward compatibility to permit both older mobile stations as well as mobile stations constructed to be operable pursuant to more recent standards is provided.

The previous descriptions are of preferred examples for implementing the invention, and the scope of the invention should not necessarily be limited by this description. The scope of the present invention is defined by the following claims.

What is claimed is:

1. In a radio communication system having a sending station operable to send data upon a forward channel to a first receiving station and to at least a second receiving station, the first receiving station operable pursuant to a first communication-system standard and the second receiving station operable pursuant to a second communication-system standard, an improvement of a message generator for the sending station for generating a synchronization message for synchronizing the first receiving station and the second receiving station, said message generator comprising:
a formatter operable for formatting the data into a first synchronization message and a second synchronization message, the first synchronization message detectable by the first receiving station and the second synchronization message detectable by the second receiving station, the first synchronization message usable for establishing synchronization with the sending station by the first receiving station and the second synchronization message usable for establishing synchronization with the sending station by the second receiving station; and
a transmitter configured for transmitting the first synchronization message and the second synchronization message upon the forward channel,
wherein the first synchronization message comprises at least a portion of the second synchronization message and a field configured to indicate whether or not the second synchronization message is available, and wherein both the first and second synchronization messages are transmitted to the same receiving station.

2. The message generator of claim 1 wherein the radio communication system comprises a cellular communication system, wherein the first communication-system standard comprises a pre-IS-2000 (pre- TIA/EJA interim standard 2000) standard, wherein the second communication-system standard comprises an IS-2000 standard, and wherein the first message into which said formatter selectably formats the data comprises a standard IS-2000 sync channel message excluding the field EXT_CDMA_FREQ.

3. The message generator of claim 2 wherein the first message includes a second-message-indicating field for indicating to the second receiving station that a second message is also being transmitted by the sending station, the second message into which said formatter selectably formats the data comprises an IS-2000 sync channel message comprising the IS-2000 standard field EXT CDMA FREQ.

4. The message generator of claim 3 wherein the second-message-indicating field forming a portion of the selected one of the pre-IS-2000 sync channel message and the IS-2000 sync channel message comprises an eight-bit field.

5. The message generator of claim 4 wherein the second-message-indicating field of the first message is formatted with a value of zero.

6. The message generator of claim 5 wherein the second-message-indicating field of the first message is formatted with a nonzero value.

7. The message generator of claim 6 wherein the sending station is further operable to send data selectably to a third receiving station, the third receiving station operable pursuant to a third communication-system standard and wherein said formatter further selectably formats the data into a third message detectable by the third receiving station.

8. The message generator of claim 7 wherein the second message includes a field for indicating to the third receiving station that a third message is also being transmitted by the sending station.

9. The message generator of claim 7 wherein the second-message-indicating field is set to a value for indicating the receiving-station communication-system standard level required to use the second message for synchronization.

10. The message generator of claim 3, wherein the second message further comprises the second-message-indicating field.

11. The message generator of claim 1 wherein the second-message-indicating field of the second message has the same value as the second-message indicating field of the first message.

12. The message generator of claim 2 wherein the second message comprises only the IS-2000 EXT CDMA FREQ field and the second-message-indicating field.

13. The message generator of claim 2, wherein the second message comprises only the IS-2000 EXT_CDMA FREQ field, the second-message-indicating field, and selected other fields.

14. The message generator of claim 13, wherein the selected other fields in the second message comprise at least one IS-2000 standard field having a value that is a function of time.

15. In a method for communicating in a radio communication system having a sending station operable to send data upon a forward channel at least to a first receiving station and to a second receiving station, the first receiving station constructed pursuant to a first communication-system standard and the second receive station operable pursuant to a second communication-system standard, an improvement of a method for generating a synchronization message for synchronizing the first receiving station and the second receiving station, said method comprising:
generating a first synchronization message, the first synchronization message usable for establishing synchronization with the sending station by the first receiving station;
transmitting the first synchronization message on the forward channel;
generating a second synchronization message, the second synchronization message usable for establishing synchronization with the sending station by the second receiving station; and
transmitting the second synchronization message on the forward channel,
wherein the first message comprises at least a portion of the second message and a field configured to indicate whether or not the second message is available, and wherein both the first and second synchronization messages are transmitted to the same receiving station.

16. The method of claim 15, wherein the second communication system standard is the TIA/EIA-IS-2000 standard.

17. The method of claim 16, wherein the first synchronization message is a sync message according to the IS-2000 standard but omitting at least one field specified in the IS-2000 standard.

18. The method of claim 17, wherein the omitted field is the EXT_CDMA_FREQ field.

19. The method of claim 18, wherein the first synchronization message includes a second-message-indicating field that is set to a non-zero value to indicate that the sending station is also generating and transmitting a second synchronization message.

20. The method of claim 19, wherein the field that is set to a non-zero value is set to a value indicating the protocol revision to which the second receiving station must be constructed in order to use the second synchronization message to perform synchronization.

21. The method of claim 19, wherein the second synchronization message includes the EXT_CDMA FREQ field as that field is specified in the IS-2000 standard.

22. The method of claim 21, wherein the second synchronization message includes less than all of the fields specified in the IS-2000 standard.

23. The method of claim 22, wherein the second synchronization message includes only the EXT_CDMA_FREQ field and the second-message-indicating field.

24. The method of claim 23, wherein the second synchronization message includes only EXT_CDMA_FREQ, second-message-indicating, and at least one field specified in the IS-2000 standard that varies as a function of time.

25. An apparatus for facilitating synchronization between a first receiving station constructed pursuant to a first communication-system standard and a second receiving station operable pursuant to a second communication-system, the apparatus comprising:

means for generating a first synchronization message, the first synchronization message usable for establishing synchronization with a sending station by the first receiving station;

means for transmitting the first synchronization message on a forward channel;

means for generating a second synchronization message, the second synchronization message usable for establishing synchronization with the sending station by the second receiving station; and means for transmitting the second synchronization message on the forward channel, wherein the first synchronization message comprises at least a portion of the second synchronization message and a field configured to indicate whether or not the second synchronization message is available, and wherein both the first and second synchronization messages are transmitted to the same receiving station.

* * * * *

UNITED STATES PATENT AND TRADEMARK OFFICE
CERTIFICATE OF CORRECTION

| | |
|---|---|
| PATENT NO. | : 7,304,964 B2 |
| APPLICATION NO. | : 10/078222 |
| DATED | : December 4, 2007 |
| INVENTOR(S) | : Kazmi et al. |

Page 1 of 1

It is certified that error appears in the above-identified patent and that said Letters Patent is hereby corrected as shown below:

<u>Column 11,</u>

Line 35, "EJA" should read --EIA--.

Signed and Sealed this

Thirteenth Day of May, 2008

JON W. DUDAS
*Director of the United States Patent and Trademark Office*